United States Patent Office 3,630,992
Patented Dec. 28, 1971

3,630,992
ORGANOTIN THIOCARBOXYLATES AND
PREPARATION THEREOF
Lawrence R. Brecker, Brooklyn, N.Y., assignor to Argus
Chemical Corporation, Brooklyn, N.Y.
No Drawing. Filed May 20, 1969, Ser. No. 826,299
Int. Cl. C08f 45/62
U.S. Cl. 260—45.75 K    14 Claims

ABSTRACT OF THE DISCLOSURE

A process is provided for preparing diorganotin monothiocarboxylates and such diorganotin monothiocarboxylates containing additional groups, including diorganotin monohalide monothio-carboxylates, by reacting a diorganotin sulfide with an acyl halide to form a diorganotin monohalide monothiocarboxylate, and optionally further reacting the diorganotin monohalide monothiocarboxylate with an active hydrogen compound such as (a) a strong inorganic acid to liberate the corresponding free thiol acid; or (b) with a weak organic acid, such as a mercaptan, mercaptoester, thiol acid, or carboxylic acid, or carboxylic acid ester or (c) an alcohol to form a diorganotin monomercaptide monothiocarboxylate, a diorganotin monomercapto acid ester monothiocarboxylate, a diorganotin dithiocarboxylate, a diorganotin monocarboxylate monothiocarboxylate, or a diorganotin monoalcoholate monothiocarboxylate.

Diorganotin monohalide monothiocarboxylates and diorganotin monomercapto acid ester monothiocarboxylates are also provided, as well as polyvinyl chloride resin compositions containing these diorganotin derivatives.

---

This invention relates to a process for preparing diorganotin monothiocarboxylates and such diorganotin monothiocarboxylates containing additional groups, by reacting a diorganotin sulfide with an acyl halide to form a diorganotin monohalide monothiocarboxylate and, optionally, further reacting the diorganotin monohalide monothiocarboxylate with an active hydrogen compound, such as (a) a strong acid to form the corresponding free thiol acid; or (b) a weak organic acid, such as a mercaptan to form a diorganotin monomercaptide monothiocarboxylate; or a mercapto acid ester to form a diorganotin monomercapto acid ester monothiocarboxylate; or a thiol acid to form a diorganotin dithiocarboxylate; or a carboxylic acid to form a diorganotin monocarboxylate monothiocarboxylate; or (c) an alcohol to form a diorganotin monoalcoholate monothiocarboxylate; to diorganotin monohalide monothiocarboxylates and diorganotin monomercapto acid ester monothiocarboxylates, which can be prepared in accordance with the above process; and to polyvinyl chloride compositions containing diorganotin monohalide monothiocarboxylates and/or diorganotin monomercapto acid ester monothiocarboxylates.

PRIOR ARTS

Diorganotin dimercaptides have been used as stabilizers for polyvinyl chloride resins where sulfur-containing organotin stabilizers are desired. Diorganotin dithiocarboxlates have also been known as stabilizers for polyvinyl chloride for some time. Both these types of organotin compounds display similar stabilizing effectiveness typical of diorganotin mercaptides; the diorganotin dithiocarboxylates have less of a strong odor, and in many instances would be preferred in stabilizer applications where the offensive odor of mercaptides presents a problem. However, the diorganotin dithiocarboxylates have not been successful commercially as have the diorganotin hydrocarbon mercaptides, primarily because of the expensive starting materials required in their preparation.

Heretofore, organotin thiocarboxylates have been prepared by reaction of organotin oxides or halides with thiol acids or their alkali metal salts.

Thus, for example, U.S. Patent No. 3,029,267, to Berenbaum et al. dated Apr. 10, 1962 discloses as effective heat stabilizers for vinyl resins dibutyltin dithioacylates having the general formula

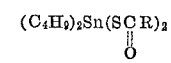

wherein the R's represent hydrocarbon radicals, preferably alkyl, aryl and aralkyl, and which are prepared by reaction of dibutyltin oxide with a thiol acid.

The thiol acids used in the preparation of the organotin thiocarboxylates are expensive and difficult to prepare, and therefore often unobtainable commercially.

Schumann et al., J. Organometal. Chem. 1964, 97, 98 disclose the preparation of diphenyltin dithiobenzoate by reacting benzoyl chloride with diphenyltin dilithium sulfied.

Netherlands application No. 6703505 discloses the preparation of diethyltin dithiobenzoate by reacting benzoyl chloride with diethyltin dithiosodium. These are substitution reactions which require removal of alkali halide from the product.

British patent specification No. 1,117,652, dated June 19, 1968 to Albright & Wilson discloses organotin heat stabilizers for vinyl chloride polymers having the formula

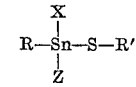

wherein R is a hydrocarbon group; X is a chlorine or bromine; R' is an organic group derived from mercaptan R'SH, an alkyl ester of a mercapto-carboxylic acid, a thio acid or a dithio-acid of the carboxylic or phosphoric series; Z is an R, X or —SR' group, or an acyloxy group R"CO₂—derived from an organic carboxylic acid R"CO₂H, where R" is a hydrocarbon group. These organotin compounds can be prepared (1) by reacting a monoorganotin trihalide or diorganotin halide with an organic mercapto compound (R'SH) in an amount insufficient to react with all the halogen atoms of the organotin halide and, preferably, in the presence of a tertiary amine as hydrogen halide acceptor, or (2) by heating the appropriate stoichiometric amounts of an organotin mercaptide of the formula $R_aSn(SR')_{4-a}$; wherein $a$ is 1 or 2 with at least one tin halide of the formula $R_bSnX_{4-b}$; wherein $b$ is 0, 1 or 2 at a temperature of from 50 to 200° C. to effect a disproportionation reaction. These procedures provide mixtures of organotin halomercaptides. The distribution of the organotin halomercaptides in such mixtures is dependent only on the proportions of the reactants since these are equilibrium reactions.

In addition, organotin thiocarboxylates are disclosed in Japanese Pat. No. 262,875 published Mar. 12, 1960 which thiocarboxylates are said to be useful in the stabilization of vinyl chloride resins, and have the formula:

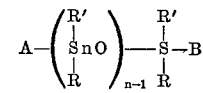

wherein R and R' are alkyl containing from one to twelve carbon atoms or benzyl, A is a radical represented by the general formula RCOS—, B is a radical which can be the same as A or similar to A, but in some cases may be a mercapto or carboxyl residue, and $n$ the number 1 or 2.

U.S. Patent No. 3,063,963 to Wooten, dated Nov. 13, 1962, discloses stabilizer combinations for vinyl chloride resins consisting of (A) a sulfur compound selected from the group consisting of compounds having one of the following formulae $$HS—C_pH_{2p}—COOH$$

or $$HS—C_mH_{2m}—OH$$

wherein $p$ is an integer of from 1 to 20 and $m$ is an integer of from 2 to 20, and (B) a diorganotin carboxylate which may be partially replaced by a dialkyl tin aliphatic acid salt having the formula

wherein $R_1$ and $R_2$ are aryl or alkyl groups, and $R_3$ and $R_4$ are acid, alcohol, mercaptan, thioacid or other groups, including thioacetate. The method for preparing the organotin thio acid derivative is not disclosed.

In accordance with the instant invention, it has been determined that diorganotin compounds containing one thiocarboxylate group and one halogen group can be obtained from relatively inexpensive starting materials in a substantially pure form, by reacting a diorganotin sulfide with an acyl halide at a temperature at which reaction proceeds to form a diorganotinmonohalide monothiocarboxylate.

The diorganotinmonohalide monothiocarboyxlates are new compounds, and are effective stabilizers in enhancing long term stability as well as enhancing resistance to the development of early discoloration of polyvinyl chloride resins.

Furthermore, in accordance with the invention, the diorganotinmonohalide monothiocarboxylates are intermediates which can be reacted with active hydrogen compounds such as strong inorganic acids, such as mineral acids, to liberate free thiol acids; or with weak organic acids, such as mercaptans, mercapto acids and esters, thiol acids, carboxylic acids, and alcohols, to form diorganotin monothiocarboxylates containing the same or different functional groups in addition to thiocarboxylate. These diorganotin monothiocarboxylates are good stabilizers for polyvinyl chloride resins.

In addition in accordance with the invention, polyvinyl chloride compositions are provided consisting essentially of a polyvinyl chloride resin and a diorganotin thiocarboxylate derivative which can be a diorganotin monohalide monothiocarboxylate, or a diorganotin monomercapto acid ester monothiocarboxylate, to enhance resistance of polyvinyl chloride resins to heat deterioration.

THE DIORGANOTIN MONOTHIOCARBOXYLATES

The diorganotin monothiocarboxylates in accordance with the invention are diorganotin salts of thiol acids, wherein each tin atom has a valence of four and is linked to two hydrocarbon groups through carbon, and is also linked to one thiocarboxylate group through sulfur, and to one group selected from the group consisting of halide groups, and mercapto acid ester radicals linked to tin through sulfur. Thus, the diorganotin thiocarboxylates of the invention can be defined by the following formula:

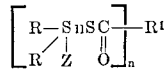

wherein $n$ is one to four, Z is a halide X, which can be fluoride, chloride or bromide, or a mercapto acid ester radical of the type $S—Z_1—(COOR^5)_m$ as is defined hereinafter. The R groups are hydrocarbon groups linked to tin through carbon, and contain from one to about eighteen carbon atoms, and can be selected from among alkyl, aryl, arylalkyl, alkylaryl, cycloalkyl, alkylcycloalkyl, and cycloalkyl. The preferred R groups are alkyl groups having from one to eight carbon atoms and the most preferred R group has four carbon atoms. The R groups can be the same or different.

$R^1$ is an organic group linked to the thiocarboxylate group and is a hydrocarbon group, which can be saturated or unsaturated such as an aliphatic, aromatic, or alicyclic group, or heterocyclic group, containing from one to about thirty carbon atoms, preferably from about one to about twelve carbon atoms, and can be monovalent or polyvalent.

$R^1$ can contain inert substituents such as halogen, sulfur, hydroxyl or nitro groups. The heterocyclic group includes oxygen or sulfur in the ring, which has from five to seven ring atoms and one or two hetero atoms, the remaining ring atoms being carbons. Thus, $R^1$ can be alkyl, aryl, alkaryl, arylalkyl, cycloalkyl, alkenyl, alkoxy, alkynyl, furfuryl, tetrahydrofurfuryl, thiophenyl, tetrahydrothiophenyl, or corresponding bivalent radicals when the thiocarboxylate group is derived from a di(thiol acid).

The $S—Z_1—COOR^5$ group is derived from a mercapto carboxylic acid ester.

$m$ is the number of $COOR^5$ groups and is an integer from one to four.

$R^5$ is an organic group derived from a monohydric or polyhydric alcohol having from one to about four hydroxyl groups and from about one to about twelve carbon atoms. If there is more than one $COOR^5$ group, the $R^5$ radicals can be the same or different.

$Z_1$ is a bivalent alkylene radical carrying the S and $COOR^5$ groups, and in addition can contain free carboxylic acid groups, carboxylic acid salt groups and mercapto groups. The $Z_1$ radical has from one to about five carbon atoms.

The $S—Z_1—(COOR^5)_m$ groups are derived from mono- or polymercapto carboxylic acid esters by removal of the hydrogen atom of the mercapto group. These include the esters of aliphatic acids which contain at least one mercapto group, such as, for example, esters of mercaptoacetic acid, $\alpha$- and $\beta$-mercaptopropionic acid, $\alpha$- and $\beta$-mercaptobutyric acid and $\alpha$- and $\beta$-mercaptovaleric acid, thiomalic acid, $\alpha$- and $\beta$-mercaptoglutaric acid, mercaptomalonic acid, $\alpha$- and $\beta$-mercaptoadipic acid and $\alpha$- and $\beta$-mercaptopimelic acid, 4-mercaptobutyric acid, $\omega$-mercaptohexanoic acid and 4-mercaptocaproic acid.

$R^5$ is an organic group derived from a monohydric or polyhydric alcohol of the formula $R^5(OH)_{n_2}$, where $n_2$ is an integer from one to about four, but is preferably one or two. Thus, $R^5$ can be alkyl, alkylene, alkenyl, aryl, arylene, mixed alkyl-aryl, mixed aryl-alkyl, cycloaliphatic and heterocyclic, and can contain from about one to about twelve carbon atoms, and can also contain ester groups, alkoxy groups, hydroxyl groups, halogen atoms and other inert substituents. Preferably, $R^5$ is derived from a monohydric alcohol containing from one to about fifteen carbon atoms, such as methyl, ethyl, propyl, s-butyl n-butyl, t-butyl, isobutyl, octyl, isooctyl, 2-ethylhexyl, 2-octyl, decyl, lauryl, cyclic monohydric alcohols, such as cyclopropanol, 2,2-dimethyl-1-cyclopropanol, cyclobutanol, 2-phenyl-1-cyclobutanol, cyclopentanol, cyclopentenol, cyclohexanol, cyclohexenol, 2-methyl-, 3-methyl-, and 4-methyl-cyclohexanol, 2-phenyl-cyclohexanol, 3,3,5-trimethyl cyclohexanol, cycloheptanol, 2-methyl-, 3-methyl- and 4-methyl-cycloheptanol, cyclooctanol, cyclononanol, cyclodecanol, cyclododecanol, or from a dihydric alcohol such as glycols containing from two to about fifteen carbon atoms, including ethylene glycol, propylene glycol, diethylene glycol, dipropylene glycol, tetramethylene glycol, neopentyl glycol and decamethylene glycol, 2,2,4-trimethyl pentanediol, 2,2,4,4-tetramethyl cyclobutane-diol, cyclohexane-1,4-dimethanol, and polyols such as glycerine, triethylol propane, mannitol, sorbitol, erythritol, dipentaerythritol, pentaerythritol, and trimethylol propane.

It is not necessary for the alcohol $(R(OH)_{n_2}$ to be a single, pure compound. Many of the commercially available and inexpensive alcohol mixtures are suitable and advantageous. The branched-chain primary alcohols made by the Oxo process and known as isooctyl, isodecyl and isotridecyl alcohols are mixtures of isomers, but can be used as if they were single compounds Other alcohol mixtures that can be used include mixed homologous primary alcohols arising from oxidation of the reaction product of ethylene with triethyl aluminum, isomers and homologous secondary alcohols from the hydration of linear $C_5$ to $C_{15}$ olefins or the oxidation of linear $C_6$ to $C_{15}$ paraffins, isomers and homologous straight-chain and methyl-branched primary alcohols resulting from the application of the Oxo process to $C_6$ to $C_{14}$ linear alpha-olefins, homologous mixtures of reaction products from ethylene oxide with alcohols, phenols, or carboxylic acids of the proper carbon content, and the like.

These mercapto acid esters, where not known, can be readily prepared by reaction of the mercaptocarboxylic acid esters with the corresponding organotin oxide or chloride. For a more complete explanation of the process for making, and for additional examples of these diorganotin mercapto ester compounds, see U.S. Pat. Nos. 2,648,650 to Weinberg et al., 2,641,596 and 2,752,325 to Leistner, and 3,115,509 to Mack, and Canadian Patent No. 649,989 to Mack.

Where Z is a halide, the diorganotin monothiocarboxylates of the invention are referred to as diorganotinhalide thiocarboxylates. Where Z is a mercapto acid ester group, the diorganotin monothiocarboxylates of the invention are referred to as diorganotin mercapto acid ester thiocarboxylates.

Examples of the diorganotinhalide thiocarboxylates, which can be used as stabilizers in polyvinyl chloride resins, in accordance with the invention, include, but are not limited to, diethyltinchloride thiobutyrate, dibutyltinchloride thiolaurate, dibutyltinchloride thiostearate, dioctyltinbromide thiocaproate, diisopropyltinfluoride thiotridecanoate, di-2-ethylhexyltinchloride thiopalmitate, diphenyltinbromide thioarachidate, ditolyltinfluoride thiopropionate, dicyclohexyltinchloride thioacetate, diisobutyltinchloride thiovalerate, dimethyltinchloride thiopelargonate, diisooctyltinchloride thiohendecanoate, bis-[dibutyltinchloride] thioglutarate, bis[dioctyltinbromide] thioadipate, bis[dipropyltinchloride] thiophthalate, bis-[dibutyltinchloride] thiomaleate, bis[diphenyltinchloride] thiosuccinate, bis[di-2-ethylhexyltiniodide] thioisophthalate, bis[diethyltinchloride] thiopimelate, and bis[dibutyltinchloride] thio-thiodipropionate.

Examples of the diorganotin mercapto acid esters thiocarboxylates in accordance with the invention include, but are not limited to, diethyltin isooctyl thioglycolate thiostearate, dibutyltin isooctyl thioglycolate thiostearate, diisopropyltin 2-ethylhexyl mercapto propionate thiolaurate, di-2-ethylhexyltin tetrahydrofurfuryl mercapto laurate thioacetate, diphenyltin 2-ethylhexyl mercapto butyrate thiocaproate, ditolyltin butoxy ethyl mercapto caproate thiotridecanoate, dimethyltin 2,2-methyl thioglycolate thiovalerate, dicyclohexyltin cyclohexylthioglycolate thiopropionate, diethyltin lauroylthioglycolate thiopalmitate, bis[dibutyltin isooctylthioglycolate] thioglutarate, bis[dioctyltin 2-ethylhexyl mercapto propionate] thioadipate, bis[dipropyltin tetrahydrofurfuryl mercapto stearate]-thiophthalate, bis[diphenyltin 2-ethylhexyl mercapto butyrate] thiosuccinate and bis[dimethyltin 2,2-dimethylthioglycolate] thiomalate.

MATERIALS FOR THE PREPARATION OF THE DIORGANOTIN MONOTHIOCARBOXYLATES

The diorganotin sulfides useful in preparing the diorganotin monohalide monothiocarboxylates of the invention contain groups linked to tin only through carbon, and sulfide sulfur groups, =S, wherein the sulfide sulfur valences are linked to the same tin atom or to different tin atoms. Each compound contains per tin atom two hydrocarbon or heterocyclic groups linked to tin through carbon.

The diorganotin sulfides useful in this invention can be defined by the following formulae:

In the case of monomers:

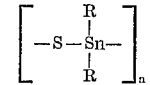

wherein R is a hydrocarbon group linked to tin through carbon, and containing from one to about eighteen carbon atoms. The atomic ratio of sulfur to tin is 1:1.

In the case of polymers:

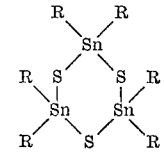

where n is the number of units in the chain, and ranges up to 100 and more.

Another way of defining the $R_2SnS$ type is as a trimer:

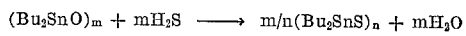

The R's are as defined above. The above formulae are not intened to limit the structure of the compound in any way. The structures can be straight chain, branched chain, cyclic, or any combination thereof.

The R hydrocarbon groups in the above formulae can be selected from among alkyl, aryl, cycloalkyl, alkylcycloalkyl, cycloalkylalkyl, and arylalkyl having from one to eighteen carbon atoms.

The preferred R groups are akyl groups having from four to eight carbon atoms.

The organotin sulfides used in this invention are well known to the art and can be prepared by a number of procedures described in earlier references which are known to the art. For example, hydrogen sulfide can be bubbled at about 40° C. into a slurry of hydrocarbontin oxide in water or an organic solvent (such as methanol, acetone, or toluene). The insoluble oxide is converted to a solution or dispersion of the sulfide and the reaction is terminated when the entire system is liquefied.

Another useful technique is the displacement of hydrocarbontin halide (e.g. $Bu_2SnCl_2$) by an aqueous alkali metal sulfide or ammonium sulfide. Hydrocarbontin sulfides also can be prepared from the interaction of hydrocarbontin halide with sulfur compounds other than sulfides, such as sodium thiosulfite and ammonium polysulfide. These reactions provide unstable intermediates that decompose to the hydrocarbontin sulfide plus another product characteristic of the particular starting materials, e.g. alkali metal sulfite or free sulfur.

All the above preparative methods can be summarized in the transformations below, where the di-n-butyltin compounds shown are representative of the entire class of organotin compounds:

$$(Bu_2SnO)_m + mH_2S \longrightarrow m/n(Bu_2SnS)_n + mH_2O$$

$$Bu_2SnCl_2 + Na_2S \longrightarrow \frac{1}{n}(Bu_2SnS)_n + 2NaCl$$

$$Bu_2SnCl_2 + Na_2S_2O_3 \longrightarrow$$
$$\frac{1}{n}(Bu_2SnS)_n + 2NaCl + N_2HSO_4 + H_2O + 2NaOH$$

$$Bu_2SnCl_2 + (NH_4)_2S_4 \longrightarrow \frac{1}{n}(Bu_2SnS)_n + 2NH_4Cl + 2S$$

When these preparations are carried out in an aqueous medium, a small proportion of the sulfur atoms in the hydrocarbontin sulfides are replaced by oxygen atoms, resulting in sulfur-deficient products having average compositions represented by the empirical formula $$(R_2SnS_pO_{1-p})$$

where $p$ is at least 0.85.

In the process of this invention, these sulfides may be used in preparing the diorganotin monohalides monothiocarboxylates, and provide stabilizers for polyvinyl chloride resins as effective as the oxygen-free sulfides, and wherever organotin sulfides are mentioned the term is intended to include both the pure compounds and the sulfur-deficient preparations.

There are many other procedures for the preparation of these compounds. The above list of procedures is not intended to be exhaustive. Organotin sulfides prepared by any other procedure would also be useful in the present combination.

The R groups linked to tin through carbon can, for example, be methyl, ethyl, propyl, isopropyl, n-butyl, isobutyl, tert-butyl, sec-butyl, amyl, hexyl, octyl, 2-ethylhexyl, isooctyl, phenyl, benzyl, cumyl, tolyl, xylyl, cyclohexyl, cyclopentyl, n-decyl, n-dodecyl, hexadecyl and octadecyl.

Examples of organotin sulfides are dipropyltin sulfide, dibutyltin sulfide, di-n-pentyltin sulfide, dihexyltin sulfide, di-2-ethylhexyltin sulfide, di(isobutyl)tin sulfide, di(n-octyltin) sulfide and dimethyltin sulfide, di(isoamyl)tin sulfide, diisohexyltin sulfide, di-2-ethyl butyltin sulfide, didodecyltin sulfide, and dioctadecyltin sulfide.

The above compounds can have any degree of polymerization falling within the above formula.

Preferred examples of organotin sulfides are dibutyltin sulfide and dioctyltin sulfide.

The acyl halides useful in this invention can be defined by the formula:

$$R^1(-\overset{O}{\underset{\|}{C}}-X)_n$$

$n$ is one to four, X is a halide and can be chloride, bromide, or fluoride, preferably chloride, and $R^1$ can be a monovalent or polyvalent organic radical containing from one to about thirty carbon atoms such as an aliphatic, aromatic, alicyclic or heterocyclic radical. Where $n$ is one, $R^1$ is monovalent and can be an organic group such as alkyl, aryl, alkaryl, arylalkyl, cycloalkyl, alkenyl, alkylcycloalkyl, cycloalkylalkyl and heterocyclic. Thus, $R^1$ can be methyl, ethyl, propyl, isopropyl, butyl, isobutyl, t-butyl, amyl, hexyl, isohexyl, heptyl, octyl, isooctyl, 2-ethylhexyl, nonyl, decyl, undecyl, dodecyl, tridecyl, stearyl, butenyl, propenyl, phenyl, naphthyl, benzyl, phenethyl, methoxyphenyl, hydroxyphenyl, cyclohexyl, cyclopentyl, ethylcyclohexyl, cyclopentylmethyl, and tetrahydrofurfuryl.

Where $n$ is two or greater, $R^1$ is a bivalent or polyvalent radical and can correspond to any of the abovementioned monovalent radicals and can be, for example, alkylene, arylene, or cycloalkylene such as

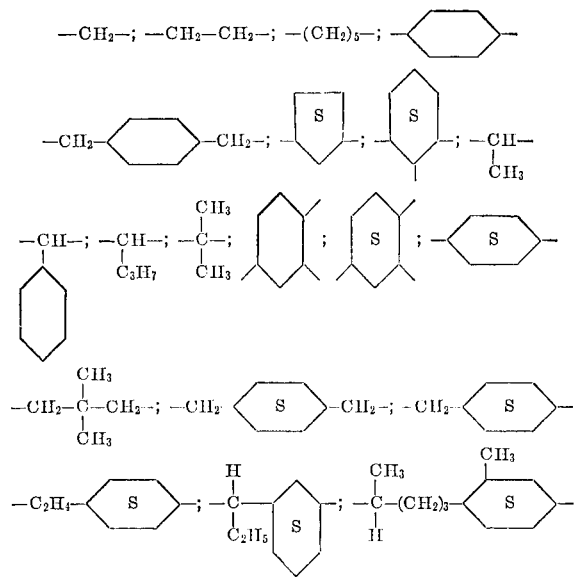

$R^1$ may also have other inert substitutents attached to the hydrocarbon group as for example, ether, thioether and halogen groups such as: —$CH_2CH_2S$—$CH_2CH_2$—; —$CH_2CH_2O$—$CH_2CH_2$; $C_{12}H_{25}SCH_2CH_2$—; and $ClCH_2CH_2CH_2$—

Exemplary acyl halides which can be employed in the invention include, but are not limited to, acetyl chloride, propinoyl chloride, butyryl bromide, 2-ethylhexanoyl chloride, lauroyl chloride, stearoyl chloride, myristoyl chloride, palmitoyl bromide, cyclohexane propionyl chloride, benzoyl chloride, 1-naphthoyl bromide, succinyl chloride, thiodipropionyl chloride, adipoyl chloride, pimeloyl chloride, dodecanedioyl chloride, 3-butenoyl bromide, phthaloyl chloride, isophthaloyl chloride, tetrahydrofurfuroyl bromide, trimelitoyl chloride, and the like.

PROCESS OF THE INVENTION

The diorganotinmonohalide monothiocarboxylates can be prepared by reaction of a diorganotin sulfide and an acyl halide as discussed hereinbefore.

In carrying out the process of the invention for preparing the diorganotinmonohalide monothiocarboxylates, the diorganotin sulfide is reacted with the acyl halide. The reaction is exothermic. The reaction mixture is maintained at a temperature within the range from about 30 to about 200° C., preferably from about 50 to about 150° C. A diluent such as toluene, benzene or xylene can be used, but is usually unnecessary. When the addition of the diorganotin sulfide is completed, the reaction is essentially complete. However, heating can be continued for another one to three hours, to insure that all of the diorganotin sulfide has reacted, but longer heating times up to about five hours can be used, if desired. The reaction can be expressed by the following equation:

$$(R_2SnS)_n + \left[X\overset{O}{\underset{\|}{C}}\right]_nR' \longrightarrow \left[R_2Sn\overset{X}{\underset{|}{}}-S\overset{O}{\underset{\|}{C}}\right]_nR'$$

where R, R' and X are as defined heretofore.

The diorganotin sulfide and acyl halide are employed in an equivalent ratio, but other ratios can be used which will give mixtures of diorganotin monohalomonothiocarboxylate and excess starting reactant.

When a stoichiometrically equivalent ratio of diorganotin sulfide and acyl halide are employed, the reaction product does not need any purification or separation since the reaction is an addition reaction. The diorganotinmonohalide monothiocarboxylates are completely compatible with polyvinyl chloride resins in the proportions required for stabilizing effectiveness.

The diorganotinhalide thiocarboxylate can be further reacted with active hydrogen compounds. These active hydrogen compounds can be weak organic acids and their metal salts or strong inorganic acids.

Where the diorganotinmonohalide monothiocarboxylate is to be further reacted with an active hydrogen compound, the reaction mixture containing the diorganotinhalide thiocarboxylate can be employed as is so that the active hydrogen compound can be added directly to such reaction mixture, or, if desired, the diorganotinhalide thiocarboxylate can be separated from any unreacted material, by conventional techniques, for example, solvent-extraction, and the substantially pure product can be reacted with the active hydrogen compound.

Normally, the diorganotinhalide thiocarboxylate is employed in an equimolar ratio to the active hydrogen compound. Other molar ratios will provide an excess of one of the reactants in admixture with the product.

The reaction temperatures employed in reacting the diorganotinhalide thiocarboxylates and the active hydrogen compound depends upon the type of active hydrogen compound employed. Reaction temperatures ranging from below room temperature up to about 200° C., and preferably, within the range from about 30 to about 150° C. are satisfactory.

The diorganotinhalide thiocarboxylates can be reacted with strong inorganic acids to liberate free thiol acids of the formula $R^1COSH$, wherein $R^1$ is as defined hereinbefore. Examples of such strong acids include, but are not limited to, hydrochloric acid, hydrobromic acid, nitric acid, sulfuric acid, sulfurous acid, and phosphoric acid.

The liberated thiol acid can then be recovered from the mixture by conventional separation techniques, such as distillation, or solvent extraction. This is a useful process for preparing thiol acids from acyl halides.

In addition, the diorganotinmonohalide monothiocarboxylates can be reacted with weak organic acids such as organic carboxylic acids, alcohols, or mercaptans, which can be represented by the formula:

$$[R^3A]_n R^2$$

$R^2$ is a hydrocarbon radical having from one to about thirty carbon atoms similar to $R^1$, or acyl radical having the formula

or a $-Z_1-COOR^5$ group (as defined hereinbefore), $R^4$ is a hydrocarbon radical having from one to about thirty carbon atoms, similar to $R^1$ or a $-Z_1-COOR^5$ group. $R^5$ is hydrogen or a metal capable of forming a salt with $[HA]_n R^2$; $R^5$ is an organic group derived from a monohydric or polyhydric alcohol, A is oxygen or sulfur, and $R^3A$ represents the group reactive with the halide of the diorganotinhalide thiocarboxylate, the $R^2$ group becoming attached to tin through A or its equivalent.

Thus, the active hydrogen compound can be a mercaptan of the formula $R^2SH$. Examples of such mercaptans include methyl mercaptan, ethyl mercaptan, propyl mercaptan, isopropyl mercaptan, butyl mercaptan, isobutyl mercaptan, n-hexyl mercaptan, cyclohexyl mercaptan, phenyl mercaptan, benzyl mercaptan, oleyl mercaptan and lauryl mercaptan.

In addition, the active hydrogen compound can be a mercapto acid ester of the formula $HS-Z_1-COOR^5$ such as isooctyl thioglycolate, di-n-butylthiomalate, 2-ethylhexyl mercapto propionate, cyclohexyl-mercapto propionate, 2-ethylhexyl mercapto butyrate, tetrahydrofurfuryl α-mercapto laurate, butoxy ethyl α-mercapto caproate, 2,2-dimethyl propyl thioglycolate, cyclohexyl thioglycolate, lauryl thioglycolate, isooctyl mercapto propionate, methyl α-mercapto laurate, ethylene glycol thioglycolate, butyl mercapto propionate, and isooctyl thiomalate.

The active hydrogen compound can be an alcohol of the formula $R^2(OH)_n$. Examples of typical alcohols are set out hereinbefore with respect to the $R^5(OH)_n$ alcohols.

The thiol acids which can be reacted with the diorganotinhalide thiocarboxylates, has the formula $R^2(COSH)_n$, wherein $R^2$ and $n$ are as defined hereinbefore and include, but are not limited to, thioacetic acid, thiopropionic acid, thiobutyric acid, thiovaleric acid, thiocaproic acid, thiopelargonic acid, thiocaprylic acid, thiocapric acid, thiolauric acid, thiomyristic acid, thiopalmitic acid, thiostearic acid, thiobenzoic acid, thio 2-naphthoic acid, thiocyclohexane acetic acid, dithioadipic acid, dithiosuccinic acid, dithioglutaric acid, dithiopimelic acid, dithiobrassylic acid, acid, dithiophthalic acid, dithioisophthalic acid, 2-octene dithioic acid, dithio-2,5-heptadienedioic acid, 1,4-cyclohexane dithiocarboxylic acid, and thiol trimellitic acid.

The active hydrogen compound can be a carboxylic acid of the formula $R^2[COOH]_n$ wherein $R^2$ and $n$ are as defined hereinbefore. Examples of such acids include, but are not liimted to, acetic acid, propionic acid, butyric acid, lauric acid, myristic acid, palmitic acid, stearic acid, cyclohexane carboxylic acid, benzoic acid, succinic acid, chloropropionic acid, glutaric acid, adipic acid, pimelic acid, suberic acid, trimellitic acid, maleic acid, phthalic acid, isophthalic acid, sorbic acid, thiodipropionic acid, 3-butenoic acid. In addition, partial esters of the above polyvalent carboxylic acids with any of the $R^5(OH)_n$ alcohols discussed hereinbefore can also be employed.

To illustrate this process, diorganotin(mercapto acid ester)thiocarboxylates can be prepared by reacting a diorganotin sulfide and an acyl halide to form a diorganotinhalide thiocarboxylate (in accordance with the reaction

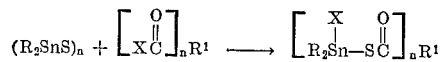

where R, $R^1$, $n$ and X are as defined heretofore) and further reacting this with a mercapto acid ester, in accordance with the following reaction:

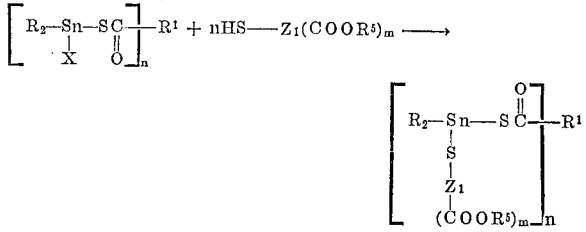

wherein R, $R^1$, $R^5$, $Z_1$ and $n$ are as defined hereinbefore.

POLYVINYL CHLORIDE RESIN COMPOSITIONS

The diorganotinhalide thiocarboxylates and the diorganotin mercapto acid ester thiocarboxylates are effective in enhancing resistance of any polyvinyl chloride resin to deterioration upon exposure to heat. The term "polyvinyl chloride" as used herein is inclusive of any polymer formed at least in part of the recurring group

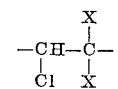

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also afterchlorinated polyvinyl chlorides such as those disclosed in British Pat. No. 893,288 and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene, propylene, and ethylene. The invention also is applicable to mixtures of polyvinyl chloride in a major proportion with other synthetic resins such as chlorinated polyethylene or a copolymer of acrylonitrile, butadiene and styrene. Among the polyvinyl chlorides which can be stabilized are the uniaxially-stretch oriented polyvinyl chlorides described in U.S. Pat. No. 2,984,593 to Isaksem et al., that is, syndiotactic polyvinyl chloride, as well as atactic and isotactic polyvinyl chlorides.

The stabilizers of this invention, including, if desired, supplementary stabilizers, are excellent stabilizers for both plasticized and unplasticized polyvinyl chloride resins. Supplementary stabilizers such as phenolic antioxidants, thiodipropionic acid esters, organic mono or polysulfides, triphosphites, and aromatic amines, all of which are disclosed in U.S. Pat. No. 3,398,114, dated Aug. 20, 1968; epoxy compounds such as described in U.S. Pat. No. 2,997,454; and α and β mercapto acids, such as thiolactic acid and β-mercaptopropionic acid can be employed. In addition, other metallic stabilizers can be employed, such as organotin compounds, polyvalent metal salts of carboxylic acids and phenols such as salts of calcium, tin, cadmium, barium, zinc, magnesium and strontium can be used.

When plasticizers are to be employed, they may be incorporated into the polyvinyl chloride resins in accordance with conventional means. The conventional plasticizers can be used, such as dioctyl phthalate, dioctyl sebacate and tricresyl phosphate. Where a plasticizer is employed, it can be used in an amount within the range from 0 to 100 parts by weight of the resin.

Particularly useful plasticizers are the epoxy higher esters having from about twenty to about one hundred fifty carbon atoms. Such esters will initially have had unsaturation in the alcohol or acid portion of the molecule, which is taken up by the formation of the epoxy group.

Typical unsaturated acids are oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethylhexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerol is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized cottonseed oil, epoxidized tall oil fatty acid esters, epoxidized linseed oil and epoxidized tallow. Of these, epoxidized soybean oil is preferred.

The alcohol can contain the epoxy group and have a long or short chain, and the acid can have a short or long chain, such as epoxy stearyl acetate, epoxy stearyl stearate, glycidyl stearate, and polymerized glycidyl methacrylate.

A small amount, usually not more than 1.5%, of a parting agent or lubricant, also can be included. Typical parting agents are the higher aliphatic acids, and salts having twelve to twenty-four carbon atoms, such as stearic acid, lauric acid, palmitic acid and myristic acid, lithium stearate and calcium palmitate, mineral lubricating oils, polyvinyl stearate, polyethylene and paraffin wax.

Impact modifiers, for improving the toughness or impact-resistance of unplasticized resins, can also be added to the resin compositions stabilized by the present invention in minor amounts of usually not more than 10%. Examples of such impact modifiers include chlorinated polyethylene, ABS polymers, and polyacrylate-butadiene graft copolymers.

The diorganotin monothiocarboxylate stabilizers of the invention, are employed in an amount sufficient to impart the desired resistance to heat deterioration at working temperatures of 350° F. and above. The longer the time and the more rigorous the conditions to which the resin will be subjected during working and mixing, the greater the amount required. Generally, as little as 0.25% total of the stabilizer by weight of the resin, will improve resistance to heat deterioration.

There is no critical upper limit on the amount, but amounts above about 15% by weight of the resin do not give an increase in stabilizing effectiveness commensurate with the additional stablizer employed. Preferably, the amount is from about 0.5 to about 5% by weight of the resin.

The diorganotin monothiocarboxylate stabilizers of the invention are extremely effective when used alone, but it can be employed together with other polyvinyl chloride resin stabilizers, if special effects are desired. The stabilizer combination of the invention in this event will be the major stabilizer, and the additional stabilizer will supplement the stabilizing action of the former, the amount of the stabilizer combination being within the range from about 0.25 to about 15 parts by weight per 100 parts of the resin, and the additional stabilizer being in an amount of from about 0.05 to about 10 parts per 100 parts of the resin.

The diorganotin monothiocarboxylates can be employed in various combinations. Examples of combinations of the diorganotin thiocarboxylates include the diorganotin mercapto acid ester thiocarboxylate and/or diorganotinhalide thiocarboxylate and/or diorganotin alcoholate thiocarboxylate, and/or diorganotin mercaptide thiocarboxylate, and/or diorganotin dithiocarboxylate and/or free thiol acid. In some cases, an enhanced synergistic stabilizer activity is observed in such combinations.

A stabilizer composition in accordance with this invention can be prepared by mixing the diorganotin monothiocarboxylate and any supplemental stabilizers with any liquid lubricant or plasticizer to be added to the resin composition with the stabilizer.

The preparation of the polyvinyl chloride resin composition is easily accomplished by conventional procedures. The selected stabilizer combination is formed as above, and then is blended with the polyvinyl chloride resin, or alternatively, the components are blended individually in the resin, using, for instance, a two or three roll mill, at a temperature at which the mix is fluid and thorough blending faciliated, milling the resin composition including any plasticizer at from 250 to 375° F. for a time sufficient to form a homogeneous mass, usually five minutes. After the mass is uniform, it is sheeted off in the usual way.

For the commercial processing of rigid polyvinyl chloride, the stabilizer is conveniently mixed with all or a portion of the polymer to be stabilized with vigorous agitation under such conditions of time and temperature that the stabilizer is sufficiently imbibed by the polymer to produce a dry, free-flowing powder. The well-known Henschel mixer is well suited to this procedure.

The following examples relate to the preparation and testing of diorganotinhalide thiocarboxylates and other diorganotin thiocarboxylates in accordance with the invention.

Example 1

Dibutyltin sulfide (132.5 g., 0.5 mole) was slowly added with stirring to lauroyl chloride (109.3 g., 0.5 mole) in a flask. The reaction was exothermic and the rate of addition of the dibutyltin sulfide was regulated to maintain the temperature of the mixture at about 60° C. When all of the dibutyltin sulfide had been added, the mixture was heated at 100° C. for three hours, and cooled. A yellow liquid was obtained which did not have any odor of lauroyl chloride. This product was dibutyltin monochloride monothiolaurate.

Example 2

Dibutyltin sulfide (142.5 g.) was slowly added to stearoyl chloride (163.5 g.). During the addition of the dibutyltin sulfide, the mixture was maintained between 60 to 70° C. After addition of the dibutyltin sulfide was complete, the reaction mixture was stirred for three hours at 100° C. On cooling, a yellow semi-solid dibutyltin monochloride monothiostearate formed.

Example 3

Isophthaloyl chloride (191.5 g.) was melted and dibutyltin sulfide (500 g.) was slowly added thereto with stirring, while maintaining the temperature between 70 and 80° C. After the addition was completed, the product was heated for three hours at 100° C. and then poured onto aluminum foil. Upon cooling, the product solidified. The product was bis[dibutyltinmonochloride]thioisophthalate.

Example 4

Dibutyltin sulfide (178.7 g.) was slowly added to adipoyl chloride (61 g.) at room temperature. The temperature of the reaction rose to about 90° C. and was kept at 90° C. for about three hours. The bis[dibutyltinchloride] thioadipate product solidified on standing three to four days.

Example 5

To 120.9 grams of dibutyltin monochloride monothiolaurate prepared as in Example 1, there was added 200 ml. of water and the mixture was stirred and heated at 50° C. Isooctyl thioglycolate (51 g., 0.25 mole) was then added. Sodium hydroxide (10 g.) dissolved in 30 ml. water was slowly added to the mixture and the temperature maintained at about 50° C. At the completion of the sodium hydroxide addition, hexane (100 ml.) was added to the mixture. Two phases formed, an upper hexane phase and a lower aqueous phase. The aqueous phase was removed from the hexane phase, which was washed with water, and stripped of hexane under vacuum. The product dibutyltin monoisooctyl thioglycolate monothiolaurate was a yellow liquid weighing 155 g. and analyzed 18.25% Sn and 9.8% S.

Example 6

Dibutyltin sulfide (66.0 g.) was slowly added to stearoyl chloride (75.9 g.), while maintaining the mixture between 60 and 70° C. After addition of the dibutyltin sulfide was complete, the mixture was stirred for three hours at 100° C. Water (200 ml.) was added and the mixture was maintained at 70° C. with stirring. Thereafter isooctyl thioglycolate (51 g.) was added. Sodium hydroxide (10 g. in 30 ml. water) was then added dropwise to the mixture while maintaining the mixture at 70° C. On cooling, hexane (about 300 ml.) was added, thereby causing the mixture to separate into an aqueous lower layer, a hexane upper layer, and a third layer at the interface. The aqueous lower layer was separated and the upper phases washed with water, charged into a flask and dried at 100° C. A yellow product dibutyltin monoisooctyl thioglycolate monothiostearate formed weighing 182 g. The product analyzed 16.1% Sn and 4.4% S.

Example 7

Bis(dibutyltinmonochloride)thioadipate (142.6 g.) as prepared in Example 4, was suspended in water (300 ml.) at 50° C. Isooctyl-3-mercaptopropionate (87.2 g.) and sodium hydroxide (16 g.) dissolved in water (25 ml.) was added dropwise and the mixture was maintained at 55° C. for 2 hours. The upper (aqueous) layer was decanted, and the lower (organic) layer washed with water and dried under vacuum at 100° C. A yellow product bis[dibutyltin(isooctyl - 3 - mercaptopropionate)]thioadipate (210 g.) was produced which analyzed 22.6% Sn and 6.2% S.

Example 8

Dibutyltin sulfide (132.5 g., 0.5 mole) was added to lauroyl chloride (109.3 g., 0.5 mole) which was stirred and maintained at 60° C. When addition of the dibutyltin sulfide was completed, the mixture was heated at 100° C. for about three hours. Thereafter, sodium methoxide (13.5 g., 0.25 mole) was slowly added to the mixture. The reaction mixture was stirred for one hour at 80° C. Water was added and the mixture stirred. The aqueous phase was removed. The organic layer was washed with water and dried.

The reaction product dibutyltin methylate thiolaurate analyzed 24% Sn and 6.7% S.

Example 9

Dibutyltin sulfide (132.5 g., 0.5 mole) was added to lauroyl chloride (109.3 g., 0.5 mole) which was stirred and maintained at 60° C. When addition of the dibutyltin sulfide was completed, the mixture was heated at 100° C. for about three hours.

Water (200 ml.) was added to 120.9 g. of the above reaction mixture and the mixture was warmed to about 50° C. Thereafter, isooctyl maleate (57 g., 0.25 mole) was added to the mixture. A solution of sodium hydroxide (10 g. in 30 ml. water) was slowly added and the reaction mixture was stirred for two hours at 60° C. The organic phase was separated, washed with additional water and dried.

The reaction product dibutyltin isooctyl maleate thiolaurate analyzed 17.6% Sn and 4.6% S.

Example 10

Dibutyltin sulfide (132.5 g., 0.5 mole) was added to lauroyl chloride (109.3 g., 0.5 mole) which was stirred and maintained at 60° C. When addition of the dibutyltin sulfide was completed, the mixture was heated at 100° C. for about three hours.

Water (200 ml.) was added to 120.9 g. of the above reaction mixture and the mixture was warmed to about 50° C. Thereafter, maleic acid (14.5 g., 0.125 mole) was added to the mixture and a solution of sodium hydroxide (10 g. in 30 ml. water) was slowly added. The reaction mixture was stirred for 3 hours at 60° C.

The reaction product bis[dibutyltin thiolaurate]maleate analyzed 23.5% Sn and 6.3% S.

Example 11

Dibutyltin sulfide (132.5 g., 0.5 mole) was added to lauroyl chloride (109.3 g., 0.5 mole) which was stirred and maintained at 60° C. When addition of the dibutyltin sulfide was completed, the mixture was heated at 100° C. for about three hours.

Water (200 ml.) was added to 120.9 g. of the above reaction mixture and the mixture was warmed to about 50° C. Thereafter, β-mercaptopropionic acid (13.25 g., 0.125 mole) was added to the mixture and a solution of sodium hydroxide (10 g. in 30 ml. water) was added slowly. The reaction mixture was stirred for two hours at 50° C.

The reaction product bis[dibutyltin thiolaurate]mercaptopropionate analyzed 23.9% Sn and 9.5% S.

Example 12

Di-n-octyltin sulfide (188.5 g., 0.5 mole) was added to 46 g. (0.5 mole) propionyl chloride which was stirred and maintained at 50° C. When addition of dioctyltin sulfide was completed, the mixture was stirred for one hour at 70° C. Dry hydrogen chloride was bubbled into the mixture and thiolpropionic acid was distilled out. 35.5 g. of thiolpropionic acid was recovered, B.P. 108–110° C., $n_D^{20}$ 1.4663. The distillation residue was identified as di-n-octyltin dichloride.

Example 13

Dimethyltin sulfide 90 g. (0.5 mole) was added to 109.3 g. (0.5 mole) lauroylchloride while stirring. The temperature was maintained at 100° C. Upon completion of the addition the mixture was stirred for 5 hours at 100° C. 100 ml. conc. HCl was added to the mixture which was stirred for another hour at 80° C. Then 200 ml. of water was added, with stirring. The aqueous phase was separated. The organic phase was diluted with 100 ml. of hexane and washed with water and dried under vacuum. The thiolauric acid recovered from the organic phase weighed 91 g. and had a sulfur content of 14.5%.

Examples I to IV

A series of polyvinyl chloride resin compositions were prepared having the following composition:

|  | Parts by weight |
|---|---|
| Diamond 450 polyvinyl chloride resin homopolymer | 100 |
| Stabilizer—As shown in Table I. | |

The components were blended, the resulting mixture was compounded and milled on a two-roll mill at 350° F. for five minutes, sheeted off, and cut into strips, and the strips heated in an oven at 375° F. and 350° F.

It is apparent from the data in Table II that the dibutyltin monoisooctyl thioglycolate monothiostearate enhances the resistance of the polyvinyl chloride resin to the development of color on heating. Furthermore, as seen in Example VI, thiolactic acid significantly improves the effectiveness of the dibutyltin monoisooctyl thioglycolate monothiostearate in inhibiting development of early discoloration in the polyvinyl chloride resin.

TABLE I
(350° F.)

| Example | Control A | Example I | Parts | Example II | Parts | Example III | Parts | Example IV | Parts |
|---|---|---|---|---|---|---|---|---|---|
| Stabilizer composition | No stabilizer. | Dibutyltin monothiolaurate monoisooctyl thioglycolate (Ex. 5). | 4.5 | Dibutyltin monothiolaurate monoisooctyl thioglycolate (Ex. 5). Thiolactic acid | 4.4 / 0.1 | Dibutyltin monothiolaurate monoisooctyl thioglycolate (Ex. 5). Zinc octoate | 4.4 / 0.1 | Dibutyltin monothiolaurate monoisooctyl thioglycolate (Ex. 5). Stannous octoate | 4.4 / 0.1 |
| Time (min.) | Color | Color | | Color | | Color | | Color | |
| Initial | Colorless | Colorless | | Colorless | | Colorless | | Colorless. | |
| 15 | Dark red | Very pale yellow | | do | | do | | Do. | |
| 30 | do | Pale yellow | | do | | Very pale yellow | | Very pale yellow. | |
| 45 | do | Light yellow | | do | | do | | Do. | |
| 60 | do | Yellow | | do | | Pale yellow | | Do. | |
| 75 | do | do | | Very faint yellow tint | | do | | Pale yellow. | |
| 90 | do | do | | Very pale yellow | | Light yellow | | Light yellow. | |
| 105 | do | do | | do | | do | | Do. | |
| 120 | do | do | | Pale yellow | | do | | Do. | |

(375° F.)

| | | | | | | | | | |
|---|---|---|---|---|---|---|---|---|---|
| Initial | Colorless | Colorless | | Colorless | | Colorless | | Colorless. | |
| 15 | Dark red | Yellow | | do | | Pale yellow | | Pale yellow. | |
| 30 | do | do | | Colorless-yellow tint | | do | | Do. | |
| 45 | do | do | | Very pale yellow | | do | | Do. | |
| 60 | do | do | | Pale yellow | | do | | Do. | |
| 75 | do | do | | do | | Light yellow | | Light yellow. | |
| 90 | do | do | | Light yellow | | Yellow | | Do. | |
| 105 | do | Yellow-brown edges | | Yellow-brown edges | | Yellow-brown edges | | Yellow-brown. | |
| 120 | do | do | | do | | Brown | | Do. | |

It is apparent from the data in Table I, that the dibutyltin monoisooctyl thioglycolate monothiolaurate significantly improves the resistance of polyvinyl chloride resin to discoloration. Furthermore, as seen in Examples II to IV, thiolactic acid, zinc octoate, and stannous octoate, respectively, significantly improve the effectiveness of the dibutyltin isooctyl thioglycolate thiostearate in inhibiting development of early discoloration in the polyvinyl chloride resin.

Examples V and VI

A series of polyvinyl chloride resin compositions were prepared having the same formulations as Examples I to IX except for the stabilizers which are shown in Table II.

Examples VII and VIII

Polyvinyl chloride resin compositions of the following formulation were prepared.

| | Parts by weight |
|---|---|
| Polyvinyl chloride homopolymer (Diamond 40) | 100 |
| Blendex 401 | 10 |
| Wax E, lubricant | 0.25 |
| Stabilizer—As shown in Table III. | |

The above formulation was blended, and the resulting mixture was milled and heated on a two-roll mill at 350° F. for five minutes, and then sheeted off. The resulting sheet was cut into strips, and the strips were tested in an oven at 375° F.

TABLE II
(350° F.)

| Example | Control A | Example V | Parts | Example VI | Parts |
|---|---|---|---|---|---|
| Stabilizer composition | No stabilizer | Dibutyltin monothiostearate monoisooctylthioglycolate (Ex. 6). | 5.2 | Dibutyltin monothiostearate monoisooctylthioglycolate (Ex. 6). Thiolactic acid | 5.1 / 0.1 |
| Time (minutes) | Color | Color | | Color | |
| Initial | Colorless | Colorless | | Colorless. | |
| 15 | Dark red | Pale yellow | | Do. | |
| 30 | | Light yellow | | Do. | |
| 45 | | do | | Do. | |
| 60 | | do | | Do. | |
| 75 | | do | | Very pale yellow. | |
| 90 | | do | | Pale yellow. | |
| 105 | | do | | Very light yellow. | |
| 120 | | do | | Do. | |

(375° F.)

| | | | | | |
|---|---|---|---|---|---|
| Initial | Colorless | Colorless | | Colorless. | |
| 15 | Dark red | Yellow | | Do. | |
| 30 | | do | | Very pale yellow. | |
| 45 | | do | | Pale yellow. | |
| 60 | | do | | Do. | |
| 75 | | do | | Light yellow. | |
| 90 | | do | | Yellow. | |
| 105 | | Yellow-brown edges | | Do. | |
| 120 | | do | | Yellow-brown edges. | |

TABLE III
(375° F.)

| Example | Control A | Example VII | Parts | Control B | Parts | Example VIII | Parts |
|---|---|---|---|---|---|---|---|
| Stabilizer combination. | No stabilizer | Bis[dibutyltinmonochloride] thioisophthalate (Ex. 3). | 2.0 | Monobutyltinsulfide | 2.0 | Bis[dibutyltinmonochloride] thioisophthalate (Ex. 3). | 1.15 |
|  |  |  |  |  |  | Monobutyltin sulfide | 3.0 |
| Time (minutes) | Color | Color |  | Color |  | Color |  |
| Initial | Colorless | Colorless |  | Colorless |  | Colorless. |  |
| 15 | Dark red | Yellow |  | Light tan |  | Pale tan. |  |
| 30 |  | do |  | Tan |  | Light tan. |  |
| 45 |  | Dark yellow |  | Dark tan |  | Do. |  |
| 60 |  | Amber |  | Brown |  | Do. |  |
| 75 |  | Dark amber |  | Dark brown |  | Tan. |  |
| 90 |  | Brown |  | Black-brown |  | Light brown. |  |
| 105 |  | do |  | Black |  | Dark brown. |  |

The data with respect to Examples VII and VIII show that bis[dibutyltinmonochloride] thioisophthalate is, in effect, a heat stabilizer. Furthermore, the data of Example VIII show that the combination with monobutyltin sulfide enhances the effectiveness of the bis[dibutyltinmonochloride] thioisophthalate as a heat stabilizer for polyvinyl chloride resin.

Examples IX to XI

Polyvinyl chloride resin compositions were prepared having the following formulation:

Parts by weight
Diamond 40, polyvinyl chloride resin homopolymer _____ 100
Blendex 401, acrylonitrile-butadiene-styrene copolymer _____ 10
Wax E, lubricant _____ 0.25
Stabilizer—As shown in Table IV.

The ingredients were blended, and the resulting mixture was compounded and heated on a two-roll mill at 350° F. for five minutes, sheeted off, and cut into strips, and heated in an oven at 375° F. The results are tabulated in Table IV.

Example XIII

Bis[dibutyltin monothiolaurate] β-mercapto propionate of Example 11 was tested in the polyvinyl chloride resin composition of Example XI. The results indicate that this material is an effective stabilizer for polyvinyl chloride.

Example XIV

Dibutyltin monochloride monothiolaurate of Example 1 was tested as a stabilizer in a polyvinyl chloride resin composition of Example XI and found to be an effective stabilizer.

Example XV

Dibutyltin monomethylate monothiolaurate of Example 8 was tested in a polyvinyl chloride resin composition of Example XI and found to be an effective heat stabilizer.

Having regard to the foregoing disclosure, the following is claimed as the inventive and patentable embodiments thereof:

1. Vinyl chloride polymer compositions having an enhanced resistance to degradation in physical properties on exposure to heat, consisting essentially of a polyvinyl

TABLE IV
(375° F.)

| Example | Control A | Example IX | Parts | Example X | Parts | Example XI | Parts | Control C | Parts |
|---|---|---|---|---|---|---|---|---|---|
| Stabilizer composition. | No stabilizer | Bis[dibutyltinmonoisooctyl mercaptopropionate] thioadipate (Ex. 7). | 1.68 | Bis[dibutyltinmonoisooctyl mercaptopropionate] thioadipate (Ex. 7). | 1.12 | Bis[dibutyltinmonoisooctyl mercaptopropionate] thioadipate (Ex. 7). | 0.84 | Dibutyltin oxide | 1.68 |
|  |  |  |  | Dibutyltin oxide | 0.26 | Dibutyltin oxide | 0.39 |  |  |
|  |  |  |  |  |  | Stannous octoate | 0.02 |  |  |
| Time (minutes) | Color | Color |  | Color |  | Color |  | Color |  |
| Initial | Colorless | Colorless |  | Colorless |  | Colorless |  | Colorless. |  |
| 15 | Dark red | Yellow |  | Light yellow |  | Pale yellow |  | Orange. |  |
| 30 |  | do |  | do |  | Light yellow |  | Do. |  |
| 45 |  | do |  | Yellow |  | Yellow |  | Red. |  |
| 60 |  | do |  | do |  | do |  | Black. |  |
| 75 |  | Light brown |  | Yellow-brown edges |  | Light brown |  |  |  |
| 90 |  | Red brown |  | Reddish brown |  | Brown |  |  |  |
| 105 |  | Dark brown |  | Dark brown |  | do |  |  |  |
| 120 |  | Black |  | Very dark brown |  | Dark brown |  |  |  |

The data in Table IV shows that the bis[dibutyltin monoisooctyl-3-mercaptopropionate] thioadipate is effective in enhancing resistance of polyvinyl chloride resin to discoloration due to exposure to heat, and that dibutyltin oxide enhances the heat stability even further. The combination of bis[dibutyltin monoisooctyl-3-mercapto propionate] thioadipate with dibutyltin oxide and stannous octoate enhances even further the resistance of the polyvinylchloride resin to early discoloration.

Example XII

Dibutyltin monothiolaurate monoisooctyl maleate of Example 9 was tested in the polyvinyl chloride resin formulation of Example XI and the results indicated that it was an effective heat stabilizer.

chloride polymer and a diorganotin thiocarboxylate having the formula:

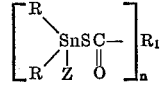

wherein $n$ is a number from 1 to 4, each R is a hydrocarbon group linked to tin through carbon and having from one to about eighteen carbon atoms, $R_1$ is an organic group having from one to about thirty carbon atoms and selected from the group consisting of unsubstituted hydrocarbon groups and hydrocarbon groups substituted with an inert substituent selected from the group consisting of halogen, sulfur, hydroxyl and nitro groups, and heterocyclic groups including oxygen or sulfur in the ring, from one to two hetero atoms, and from five to seven ring atoms, and Z is selected from the group consisting of fluoride, chloride, bromide, and mercaptocarboxylic acid ester radicals having the formula $$-S-Z(COOR_5)_m$$

wherein $m$ is a number from 1 to 4, $R_5$ is an organic group derived from a monohydric or polyhydric alcohol having from one to about four hydroxyl groups and from one to about twelve carbon atoms, and selected from the group consisting of unsubstituted alcohols and substituted alcohols containing a substituent selected from the group consisting of ester groups, alkoxy groups, hydroxyl groups, and halogen atoms, $Z_1$ is a bivalent alkylene radical having from one to about five carbon atoms and is selected from the group consisting of unsubstituted alkylene radicals and substituted alkylene radicals having a substituent selected from free carboxylic acid groups, carboxylic acid salt groups, and mercapto groups.

2. A vinyl chloride polymer composition in accordance with claim 1 in which the diorganotin thiocarboxylate is a diorganotin chloride thiocarboxylate.

3. A vinyl chloride polymer composition in accordance with claim 1, wherein the diorganotin thiocarboxylate is a diorganotin mercaptocarboxylic acid ester thiocarboxylate.

4. A vinyl chloride polymer composition in accordance with claim 1, wherein Z is chlorine, $n$ is 1 and $R_1$ is lauryl.

5. A vinyl chloride polymer composition in accordance with claim 1 in which Z is isooctyl thioglycolate, $n$ is 1 and $R_1$ is lauryl.

6. A vinyl chloride polymer composition in accordance with claim 1, wherein Z is chlorine, $n$ is 1 and $R_1$ is stearyl.

7. A vinyl chloride polymer composition in accordance with claim 1, in which Z is isooctyl thioglycolate, $n$ is 1 and $R_1$ is stearyl.

8. A vinyl chloride polymer composition in accordance with claim 1, wherein Z is chlorine, $n$ is 2 and $R_1$ is butylene.

9. A vinyl chloride polymer composition in accordance with claim 1, wherein Z is chlorine, $n$ is 2 and $R_1$ is butylene.

10. A vinyl chloride polymer composition in accordance with claim 1, wherein Z is chlorine, $n$ is 2 and $R_1$ is butylene.

11. A vinyl chloride polymer composition in accordance with claim 1, where Z is isooctyl-3-mercaptopropionate, $n$ is 2 and $R_1$ is butylene.

12. A vinyl chloride polymer composition in accordance with claim 1, in which the vinyl chloride polymer is polyvinyl chloride.

13. A vinyl chloride polymer composition in accordance with claim 1, wherein the vinyl chloride polymer is a rigid polyvinyl chloride resin.

14. A vinyl chloride polymer composition in accordance with claim 1, in which the amount of diorganotin thiocarboxylate is within the range from about 0.25 to about 15% by weight of the resin.

References Cited

UNITED STATES PATENTS 3,029,267   4/1962   Berenbaum et al. __ 260—429.7

FOREIGN PATENTS 1,117,652   6/1968   Great Britain _____ 260—45.75

DONALD E. CZAJA, Primary Examiner

V. P. HOKE, Assistant Examiner

U.S. Cl. X.R.

260—347.2, 429.7

PO-1050
(5/69)

UNITED STATES PATENT OFFICE
CERTIFICATE OF CORRECTION

Patent No. 3,630,992          Dated December 28, 1971

Inventor(s) Lawrence Brecker

It is certified that error appears in the above-identified patent and that said Letters Patent are hereby corrected as shown below:

Column 1, line 59   : "ARTS" should be -- ART --

Column 2, line 20   : "fied" should be -- fide --

Column 2, lines 63-68:

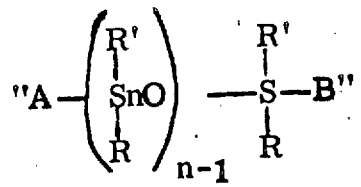

should be:

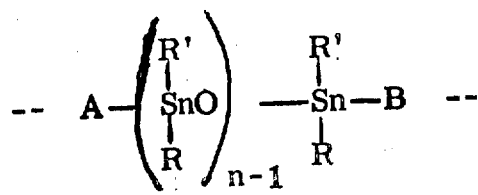

Column 6, line 26   : "intened" should be -- intended --

Column 6, line 33   : "akyl" should be -- alkyl --

Column 8, line 1    :  should be --  --

Column 8, line 21   : "propinoyl" should be -- propionyl --

Column 8, line 28   : "trimelitoyl" should be -- trimellitoyl --

UNITED STATES PATENT OFFICE
CERTIFICATE OF CORRECTION

Patent No. 3,630,992   Dated December 28, 1971

Inventor(s) Lawrence R. Brecker   - 2 -

It is certified that error appears in the above-identified patent and that said Letters Patent are hereby corrected as shown below:

Column 9, line 38, "$R^5$" should read -- $R^3$ --.

Column 15, line 38, "tfrom" should read -- from --; line 51, "IX" should read -- IV --. Column 19, line 27, "viuyl" should read -- vinyl --.

Signed and sealed this 27th day of March 1973.

(SEAL)
Attest:

EDWARD M. FLETCHER, JR.　　　　　　　ROBERT GOTTSCHALK
Attesting Officer　　　　　　　　　　Commissioner of Patents